US005472013A

United States Patent [19]
Irgens

[11] Patent Number: 5,472,013
[45] Date of Patent: Dec. 5, 1995

[54] FUEL INJECTION NOZZLE

[75] Inventor: Christopher R. Irgens, Elm Grove, Ill.

[73] Assignee: Outboard Marine Corporation, Waukegan, Ill.

[21] Appl. No.: 276,718

[22] Filed: Jul. 18, 1994

[51] Int. Cl.[6] .......... F16K 17/04

[52] U.S. Cl. .......... 137/541; 137/550; 239/453

[58] Field of Search .......... 137/541, 550; 239/453, 533.3, 533.7, 533.9, 533.11, 533.12

[56] References Cited

U.S. PATENT DOCUMENTS

| | | | |
|---|---|---|---|
| T884,012 | 3/1971 | Blades | 137/541 |
| 2,433,985 | 1/1948 | Fodor | 239/453 |
| 2,860,780 | 11/1958 | Ziesche et al. | 299/107.6 |
| 3,247,967 | 4/1966 | Kucmerosky | 137/541 X |
| 3,351,081 | 11/1967 | Bogossian | 137/541 X |
| 4,034,917 | 7/1977 | Bailey | 239/533.7 X |
| 4,350,301 | 9/1982 | Erwin | 239/453 |
| 4,394,970 | 7/1983 | Hofmann et al. | 239/453 |
| 4,691,864 | 9/1987 | Greeves | 239/453 |
| 4,747,545 | 5/1988 | Trachte et al. | 239/533.9 |
| 4,763,843 | 8/1988 | Bombis et al. | 239/571 |

*Primary Examiner*—Robert G. Nilson
*Attorney, Agent, or Firm*—Michael, Best & Friedrich

[57] ABSTRACT

A valve assembly including a valve housing adapted to be fixed in the bore of a member supplying fuel under pressure, the valve housing including a bore which extends along an axis, which is adapted to communicate with the bore of the member and which has an end portion defining a valve seat, a valve member moveable in the axial bore in the valve housing between a closed position in which the valve member is engaged with the valve seat and an open position in which the valve member is spaced from the valve seat, the valve member including an inner end, a retainer rigidly fixed to the inner end of the valve member, and a spring bearing against the valve housing and against the retainer so as to bias the valve member into the closed position when the fuel pressure in the valve assembly is below a predetermined pressure.

20 Claims, 1 Drawing Sheet

FUEL INJECTION NOZZLE

BACKGROUND OF THE INVENTION

The invention relates generally to internal combustion engines and, more particularly, to fuel injection systems for internal combustion engines. Still more particularly, the invention relates to high pressure fuel injection nozzles or valves.

SUMMARY OF THE INVENTION

The invention provides a high pressure fuel injection nozzle which is relatively inexpensive, which is easy to manufacture, and which can be manufactured from mass-produced parts while providing a consistent needle stroke from one nozzle to another. The number of critical dimensions in the nozzle assembly is reduced by controlling the needle stroke during the assembly process.

More particularly, the invention provides a valve assembly including a valve housing adapted to be connected to a conduit supplying fuel under pressure, the valve housing including a bore which extends along an axis, which is adapted to communicate with the conduit and which has an end portion defining a valve seat, a valve member moveable in the axial bore between a closed position in which the valve member is engaged with the valve seat and an open position in which the valve member is spaced from the valve seat, the valve member including an end portion, a retainer initially fabricated separately from the valve member and thereafter rigidly fixed to the end portion of the valve member, and a spring bearing against the valve housing and against the retainer so as to bias the valve member into the closed position when the fuel pressure in the valve assembly is below a predetermined pressure.

The invention also provides a method of assembling a valve assembly as described above, the method comprising the steps of locating the valve member in the axial bore, locating the spring against the valve housing, locating the retainer against the spring without fixing the retainer to the valve member, locating the valve member in the open position to establish the proper spacing between the valve member and the valve seat when the valve member is in the open position, moving the retainer against the force of the spring, relative to the valve member, and into engagement with the surface of the valve housing while maintaining the proper spacing between the valve member and the valve seat, and fixing the retainer to the valve member so that the valve member thereafter moves with the retainer and to the closed position when the retainer is released from engagement with the surface of the valve housing.

Other features and advantages of the invention will become apparent to those skilled in the art upon review of the following detailed description, claims, and drawings.

Figure 1:
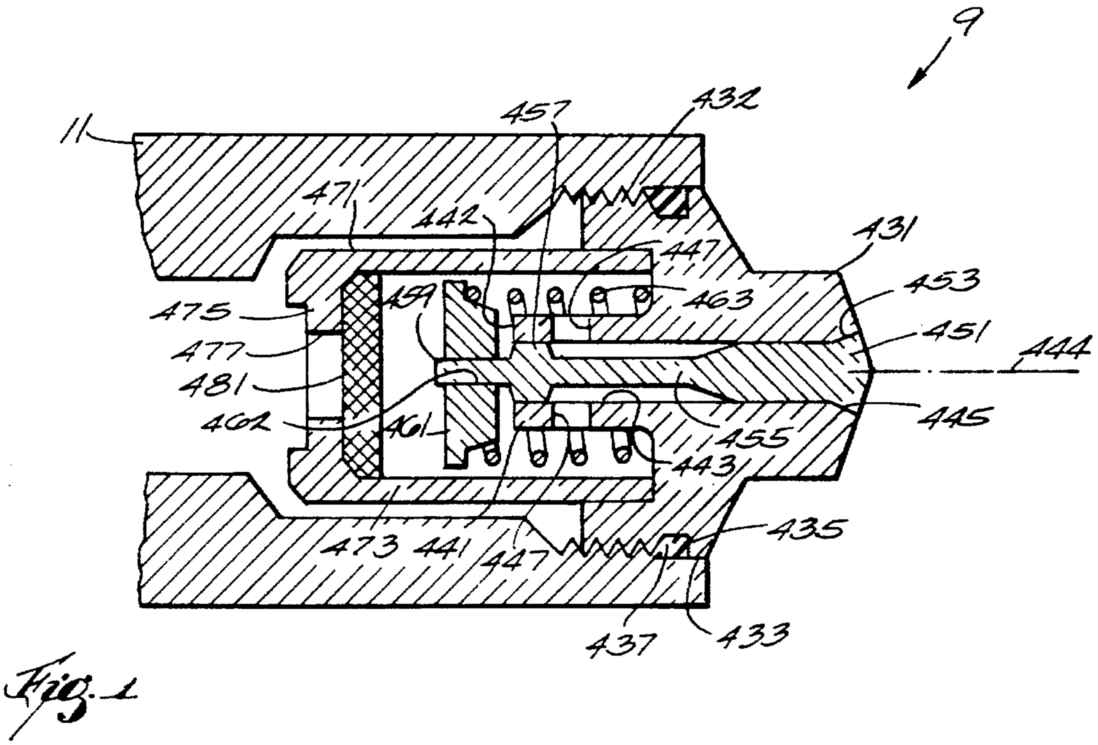
FIG. 1 is a fragmentary sectional view of a high pressure fuel injection nozzle assembly embodying various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in the drawing is a high pressure fuel injection nozzle or valve assembly 9 which is adapted to be fixed to a cylinder head (not shown) and to a source of high pressure fuel (not shown) and which is operative to deliver the high pressure fuel through the nozzle or valve assembly 9 to a combustion chamber (not shown) of an internal combustion engine in response to the presence at the nozzle or valve assembly 9 of the high pressure fuel. The nozzle assembly 9 is preferably used in the manner described in U.S. Ser. No. 08/276,545 (Atty. Docket No. 72012/2660), which was filed concurrently herewith, which is assigned to the assignee hereof, which is titled "Combined Fuel Injection Pump and Nozzle," and which is incorporated herein by reference.

The valve or nozzle assembly 9 includes a valve housing 431 which includes a cylindrical main portion 432 and which is threadedly received in the end of a conduit 11 that conducts high pressure fuel to the nozzle assembly 9. The main portion 432 includes an outer surface 433 with an annular groove 435 receiving a seal member in the form of an O-ring 437 sealingly engaged between the valve housing 431 and the conduit 11. The valve housing 431 also includes a cylindrical portion 441 which extends from the main portion 432. The cylindrical portion 441 has a left end or surface 442. The valve housing 431 has therein a bore 443 which extends along an axis 444 and which, at the right end thereof, includes a radially outwardly extending or frustoconical valve seat 445. Located in the cylindrical portion 441 are one or more transverse apertures 447 permitting fuel flow from radially outwardly of the cylindrical portion 441 into the axial bore 443.

Located in the axial bore 443 is a valve member or needle 451 which, at the right end thereof, includes a radially outwardly extending or frustoconical valve surface 453 which is complementary with and which is adapted to seat against the valve seat 445. The valve member 451 also includes, in series, a stem portion 455 of reduced diameter as compared to the axial bore 443, an enlarged portion 457 guidingly engaging the inner surface of the cylindrical portion 441, and a projecting end portion 459 of reduced diameter. The valve member 451 is moveable in the axial bore 443 between a closed position (see FIG. 1) in which the valve surface 453 is engaged with the valve seat 445 and an open position (not shown) in which the valve surface 453 is spaced from the valve seat 445.

Means are provided for releaseably biasing the valve surface 453 against the valve seat 445. While other constructions can be employed, in the disclosed construction, such means comprises a collar or retainer 461 which has a cylindrical outer surface and which is suitably rigidly fixed to the projecting end portion 459 of the valve member 451. Preferably, the retainer 461 has therein an axial bore 462, the end portion 459 of the valve member 451 is press fit into the bore 462, and the retainer 461 is welded to the valve member 451 by a suitable technique such as laser welding, electron beam welding, or TIG welding. In one alternative construction, the retainer 461 can simply be press fit onto the valve member 451 without welding. In another alternative construction, the retainer 461 can fit loosely on the end portion 459 of the valve member 451 until the retainer 461 is welded to the valve member 451. In any event, the retainer 461 is ultimately rigidly fixed to the valve member 451 so that the retainer 461 does not move relative to the valve member 451 during normal operation of the valve assembly 9.

The biasing means also includes a helical spring 463 which, at one end, bears against the collar 461, which extends in surrounding relation to the cylindrical portion 441 of the valve housing 431, and which, at the other end, bears against the main portion 432 of the valve housing 431. The spring 463 biases the valve member 451 into the closed position when the fuel pressure in the valve assembly 9 is below a predetermined pressure. The valve member 451 moves to the open position against the force of the spring 463 when the fuel pressure in the valve assembly 9 is above the predetermined pressure. The spring 463 thus determines the predetermined fuel pressure required to open the valve assembly 9. The retainer 461 is spaced from the end 442 of the valve housing 431 when the valve member 451 is in the closed position. The retainer 461 engages the end 442 of the valve housing 431 when the valve member 451 moves to the open position. In other words, the retainer 461 stops the valve member 451 when the retainer 461 engages the end 442 of the housing 431. The retainer 461 thereby controls the spacing between the valve surface 453 and the valve seat 445 when the valve member 451 moves to its open position as a result of the fuel pressure in the valve assembly 9 being above the predetermined pressure.

The valve or nozzle assembly 9 also includes a cup-shaped housing 471 which has a cylindrical portion 473 which is in surrounding relation to the helical spring 463 and which, at the right end thereof, is suitably rigidly fixed to the main portion 432 of the valve housing 431. The housing 471 has an inner surface with an inside diameter greater than the outside diameter of the retainer 461 so that fuel can flow around the retainer 461 and inside the cup-shaped housing 471. After flowing around the retainer 461, the fuel flows through the apertures 447 and into the axial bore 443. The cup-shaped housing 471 also includes, at the left end thereof, an end portion or wall 475 which extends transversely to the axis 444 and which includes an axial bore 477. Located within the cup-shaped housing 471, adjacent the end portion 475, is a suitable fuel screen or filter 481 through which high pressure fuel passes.

The valve assembly 9 is assembled by placing the valve housing 431 in a fixture (not shown), locating the valve member 451 in the axial bore 443, locating the spring 463 against the valve housing 431, and locating the retainer 461 against the spring 463 without fixing the retainer 461 to the valve member 451. Next, the valve member 451 is moved to the open position, which is controlled by the fixture, to establish the proper spacing between the valve surface 453 and the valve seat 445 when the valve member 451 is in the open position. Thus, the fixture must be able to hold the valve housing 431 in a fixed position and must provide a surface against which the needle 451 is held to provide the desired spacing between the valve surface 453 and the valve seat 445. Next, the retainer 461 is moved against the force of the spring 463, relative to the valve member 451, and into engagement with the surface or end 442 of the valve housing 431 while the fixture maintains the proper spacing between the valve surface 453 and the valve seat 445. During this movement of the retainer 461, the valve member 451 moves in the bore 462 in the retainer 461. Finally, the retainer 461 is fixed to the valve member 451 as described above so that the valve member 451 thereafter moves with the retainer 461 and to the closed position when the retainer 461 is released from engagement with the surface 442 of the valve housing 431.

Various of the features of the invention are set forth in the following claims.

I claim:

1. A valve assembly including a valve housing adapted to be connected to a conduit supplying fuel under pressure, said valve housing including an axial bore which extends along an axis, which is adapted to communicate with the conduit and which has an end portion defining a valve seat, and a transverse bore communicating with said axial bore, a valve member moveable in said bore between a closed position in which said valve member is engaged with said valve seat and an open position in which said valve member is spaced from said valve seat, said valve member including an end portion, a retainer rigidly fixed to said end portion of said valve member, and including a cylindrical outer surface with an outside diameter, a spring bearing against said valve housing and against said retainer so as to bias said valve member into said closed position when the fuel pressure in said valve assembly is below a predetermined pressure, and a cupp-shaped member including a wall extending transversely to said axis and including a axial bore, and a cylindrical portion which extends from said transverse wall, which is fixed to said valve housing, which includes an inner surface having an inside diameter greater than said outside diameter of said retainer and which defines an interior space communicating through said transverse bore with said axial bore in said valve housing.

2. A valve assembly in accordance with claim 1 wherein said valve member moves to said open position against the force of said spring when the fuel pressure in said valve assembly is above said predetermined pressure.

3. A valve assembly in accordance with claim 2 wherein said valve housing has an end, wherein said retainer is spaced from said end of said valve housing when said valve member is in said closed position, and wherein said retainer engages said end of said valve housing when said valve member moves to said open position.

4. A valve assembly in accordance with claim 1 wherein said retainer is welded to said valve member.

5. A valve assembly in accordance with claim 1 wherein said retainer is press fit to said valve member.

6. A valve assembly in accordance with claim 5 wherein said retainer has therein a bore, and wherein said valve member is press fit into said bore in said retainer.

7. A valve assembly in accordance with claim 1 wherein said retainer has therein a bore, and wherein said valve member extends into said bore in said retainer.

8. A valve assembly in accordance with claim 1 wherein the position of said retainer relative to said valve member and along said axis is adjustable while said valve member and said retainer are located in said valve housing and prior to said retainer being rigidly fixed to said valve member.

9. A valve assembly including a valve housing adapted to be connected to a conduit supplying fuel under pressure, said valve housing including a bore which extends along an axis, which is adapted to communicate with the conduit, and which has an end portion defining a valve seat, a valve member moveable in said bore between a closed position in which said valve member is engaged with said valve seat and an open position in which said valve member is spaced from said valve seat, said valve member including an end portion, a retainer rigidly fixed to said end portion of said valve member, a spring bearing against said valve housing and against said retainer so as to bias said valve member into said closed position when the fuel pressure in said valve assembly is below a predetermined pressure, a cup-shaped member including a wall extending transversely to said axis and including an axial bore, and a cylindrical portion which extends from said transverse wall and which is fixed to said valve housing, and a fuel filter housed in said cylindrical portion of said cup-shaped member.

10. A valve assembly including a valve housing adapted to be connected to a conduit supplying fuel under pressure, said valve housing having a surface and including an axial bore which extends along an axis, which is adapted to communicate with the conduit, and which has an end portion defining a valve seat, and a transverse bore communicating with said axial bore, a valve member moveable in said bore and along said axis between a closed position in which said valve member is engaged with said valve seat and an open position in which said valve member is spaced from said valve seat, said valve member including an end portion, a retainer rigidly fixed to said end portion of said valve member such that said retainer is spaced from said surface of said valve housing when said valve member is in said closed position and such that said retainer engages said surface of said valve housing when said valve member moves to said open position, and including a cylindrical outer surface with an outside diameter, a spring bearing against said valve housing and against said retainer such that said spring biases said valve member into said closed position when the fuel pressure in said valve assembly is below a predetermined pressure, and such that said valve member moves to said open position against the force of said spring when the fuel pressure in said valve assembly is above said predetermined pressure, and a cup-shaped member including a wall extending transversely to said axis and including an axial bore, and a cylindrical portion which extends from said transverse wall, which is fixed to said valve housing, and which includes an inner surface having an inside diameter greater than said outside diameter of said retainer and which defines an interior space communicating through said transverse bore with said axial bore in said valve housing.

11. A valve assembly in accordance with claim 10 wherein said retainer is welded to said valve member.

12. A valve assembly in accordance with claim 10 wherein said retainer is press fit to said valve member.

13. A valve assembly in accordance with claim 12 wherein said retainer has therein a bore, and wherein said valve member is press fit into said bore in said retainer.

14. A valve assembly in accordance with claim 10 wherein said retainer has therein a bore, and wherein said valve member extends into said bore in said retainer.

15. A valve assembly including a valve housing adapted to be connected to a conduit supplying fuel under pressure, said valve housing having a surface and including a bore which extends along an axis, which is adapted to communicate with the conduit and which has an end portion defining a valve seat, a valve member moveable in said bore and along said axis between a closed position in which said valve member is engaged with said valve seat and an open position in which said valve member is spaced from said valve seat, said valve member including an end portion, a retainer rigidly fixed to said end portion of said valve member such that said retainer is spaced from said surface of said valve housing when said valve member is in said closed position and such that said retainer engages said surface of said valve housing when said valve member moves to said open position, a spring bearing against said valve housing and against said retainer such that said spring biases said valve member into said closed position when the fuel pressure in said valve assembly is below a predetermined pressure, and such that said valve member moves to said open position against the force of said spring when the fuel pressure in said valve assembly is above said predetermined pressure, and a cup-shaped member including a wall extending transversely to said axis and including an axial bore, and a cylindrical portion which extends from said transverse wall and which is fixed to said valve housing.

16. A valve assembly in accordance with claim 15 and further including a fuel filter housed in said cylindrical portion of said cup-shaped member.

17. A valve assembly in accordance with claim 15 wherein said retainer is welded to said valve member.

18. A valve assembly in accordance with claim 15 wherein said retainer is press fit to said valve member.

19. A valve assembly in accordance with claim 15 wherein said retainer has therein a bore, and wherein said valve member is press fit into said bore in said retainer.

20. A valve assembly in accordance with claim 15 wherein said retainer has therein a bore, and wherein said valve member extends into said bore in said retainer.

* * * * *